(12) United States Patent
Hikata et al.

(10) Patent No.: US 12,221,347 B2
(45) Date of Patent: Feb. 11, 2025

(54) CARBON NANOTUBE ASSEMBLED WIRE AND CARBON NANOTUBE ASSEMBLED WIRE BUNDLE

(71) Applicants: SUMITOMO ELECTRIC INDUSTRIES, LTD., Osaka (JP); UNIVERSITY OF TSUKUBA, Tsukuba (JP)

(72) Inventors: Takeshi Hikata, Osaka (JP); Toshihiko Fujimori, Osaka (JP); Soichiro Okubo, Osaka (JP); Jun Otsuka, Osaka (JP); Jun-ichi Fujita, Tsukuba (JP)

(73) Assignees: SUMITOMO ELECTRIC INDUSTRIES, LTD., Osaka (JP); UNIVERSITY OF TSUKUBA, Tsukuba (JP)

(*) Notice: Subject to any disclaimer, the term of this patent is extended or adjusted under 35 U.S.C. 154(b) by 527 days.

(21) Appl. No.: 17/639,482

(22) PCT Filed: Aug. 28, 2020

(86) PCT No.: PCT/JP2020/032598
§ 371 (c)(1),
(2) Date: Mar. 1, 2022

(87) PCT Pub. No.: WO2021/044964
PCT Pub. Date: Mar. 11, 2021

(65) Prior Publication Data
US 2022/0315427 A1    Oct. 6, 2022

(30) Foreign Application Priority Data

Sep. 3, 2019   (JP) .................................. 2019-160768

(51) Int. Cl.
*C01B 32/158*   (2017.01)
*D01F 9/127*   (2006.01)

(52) U.S. Cl.
CPC .......... *C01B 32/158* (2017.08); *D01F 9/1272* (2013.01); *C01B 2202/08* (2013.01); *C01P 2002/82* (2013.01); *C01P 2004/02* (2013.01)

(58) Field of Classification Search
CPC ... C01B 32/158; C01B 2202/08; C01B 32/16; C01B 32/168; C01B 32/159;
(Continued)

(56) References Cited

U.S. PATENT DOCUMENTS

2007/0224107 A1   9/2007   Hikata
2007/0243124 A1*  10/2007  Baughman ............. H01G 11/22
                                                    423/447.1
(Continued)

FOREIGN PATENT DOCUMENTS

JP   2005-330175 A     12/2005
JP   2006-213590 A  *   8/2006  ............. C01B 31/02
(Continued)

OTHER PUBLICATIONS

Written Opinion of the International Searching Authority for PCT/JP2020/032598, mailed Nov. 2, 2020 (Year: 2020).*
(Continued)

*Primary Examiner* — Daniel C. McCracken
(74) *Attorney, Agent, or Firm* — Oliff PLC (57) ABSTRACT

A carbon nanotube assembled wire includes a plurality of carbon nanotubes, wherein in a Raman spectrum of the carbon nanotube assembled wire, a ratio IB/IA of an integrated intensity IA in a range of a Raman shift of 120 cm$^{-1}$ or more and 210 cm$^{-1}$ or less and an integrated intensity IB in a range of a Raman shift of more than 210 cm$^{-1}$ and 280 cm$^{-1}$ or less is 0.1 or more.

5 Claims, 6 Drawing Sheets

(58) Field of Classification Search
CPC ... C01B 32/162; C01B 32/164; C01B 32/166; C01B 32/17; C01B 32/172; C01B 32/174; C01B 32/176; C01B 32/178; C01B 2202/00; C01B 2202/02; C01B 2202/04; C01B 2202/06; C01B 2202/10; C01B 2202/20; C01B 2202/22; C01B 2202/24; C01B 2202/26; C01B 2202/28; C01B 2202/30; C01B 2202/32; C01B 2202/34; C01B 2202/36; D01F 9/1272; D01F 9/133; D01F 9/12; D01F 9/127; D01F 9/1271; D01F 9/1273; D01F 9/1274; D01F 9/1275; D01F 9/1276; D01F 9/1277; D01F 9/1278; C01P 2002/82; C01P 2004/02

See application file for complete search history.

(56) References Cited

U.S. PATENT DOCUMENTS

| | | | |
|---|---|---|---|
| 2009/0202422 A1* | 8/2009 | Kajiura | B82Y 30/00 |
| | | | 423/447.2 |
| 2019/0355490 A1* | 11/2019 | Yamazaki | D01F 9/12 |

FOREIGN PATENT DOCUMENTS

| | | | | |
|---|---|---|---|---|
| JP | 2015-093807 A | * | 5/2015 | C01B 31/02 |
| WO | WO 2018/143466 A1 | * | 8/2018 | H01B 1/04 |

OTHER PUBLICATIONS

Araujo, et al., Resonance Raman Spectroscopy of the radial breathing modes in carbon nanotubes, Physica 2010; 42: 1251-1261 (Year: 2010).*

Ekawa-Raus et al., "Electrical Properties of Carbon Nanotube Based Fibers and Their Future Use in Electrical Wiring," Advanced Functional Materials, 2014, vol. 24, pp. 3661-3682.

* cited by examiner

CARBON NANOTUBE ASSEMBLED WIRE AND CARBON NANOTUBE ASSEMBLED WIRE BUNDLE

TECHNICAL FIELD

The present disclosure relates to a carbon nanotube assembled wire and a carbon nanotube assembled wire bundle. The present application claims a priority based on Japanese Patent Application No. 2019-160768 filed on Sep. 3, 2019, the entire content of which is incorporated herein by reference.

BACKGROUND ART

A carbon nanotube (hereinafter also referred to as CNT) composed of a cylindrical graphene sheet made of carbon atoms bonded in a hexagonal pattern is a material having excellent characteristics, such as a weight that is one fifth of that of copper, a strength that is 20 times that of steel, and a metal-like electrical conductivity. Thus, an electric wire using the carbon nanotube is expected as a material contributing to decreased weight and size and improved corrosion resistance of motors for cars in particular.

The carbon nanotube is obtained, for example, through vapor deposition by supplying a carbon-containing source gas while heating a fine catalyst such as iron to grow the carbon nanotube from the catalyst, as described in PTL 1 (Japanese Patent Laid-Open No. 2005-330175).

CITATION LIST

Patent Literature

PTL 1: Japanese Patent Laid-Open No. 2005-330175

Non Patent Literature

NPL 1: Agnieszka Lekawa-Raus et al. "Electrical Properties of Carbon Nanotube Based Fibers and Their Future Use in Electrical Wiring", Advanced Functional Materials, Vo. 24, p.p. 3661-3682 (2014). DOI: 10.1002/adfm.201303716

SUMMARY OF INVENTION

A carbon nanotube assembled wire according to one embodiment of the present disclosure is a carbon nanotube assembled wire including a plurality of carbon nanotubes, wherein
in a Raman spectrum of the carbon nanotube assembled wire, a ratio IB/IA of an integrated intensity IA in a range of a Raman shift of 120 $cm^{-1}$ or more and 210 $cm^{-1}$ or less and an integrated intensity IB in a range of a Raman shift of more than 210 $cm^{-1}$ and 280 $cm^{-1}$ or less is 0.1 or more.

A carbon nanotube assembled wire bundle according to another embodiment of the present disclosure is a carbon nanotube assembled wire bundle including a plurality of the above-described carbon nanotube assembled wires, wherein
in a Raman spectrum of the carbon nanotube assembled wire bundle, the ratio IB/IA of the integrated intensity IA in the range of the Raman shift of 120 $cm^{-1}$ or more and 210 $cm^{-1}$ or less and the integrated intensity IB in the range of the Raman shift of more than 210 $cm^{-1}$ and 280 $cm^{-1}$ or less is 0.1 or more,
in the carbon nanotube assembled wire, the carbon nanotubes are oriented at a degree of orientation of 0.9 or more and 1 or less, and
in the carbon nanotube assembled wire bundle, the carbon nanotube assembled wires are oriented at a degree of orientation of 0.8 or more and 1 or less.

DETAILED DESCRIPTION

Problem to be Solved by the Present Disclosure

Carbon nanotubes obtained with the state of the art of producing carbon nanotubes have a diameter of about 0.4 nm to 20 nm and a maximum length of about 55 cm. In order to use a carbon nanotube as a high strength material, the carbon nanotube needs to be longer, and accordingly, techniques capable of elongating a carbon nanotube have been studied.

As one method for elongating a carbon nanotube, a method for orienting and assembling a plurality of carbon nanotubes together in a longitudinal direction to be an assembled wire may be considered.

As one of such methods, a method has been studied in which a plurality of non-oriented CNTs are mixed with a dispersing agent (a surfactant, a polymer, or the like) and are injection-molded into the form of fiber, thereby obtaining a CNT assembled wire (NPL 1). In this method, a step of removing the dispersing agent is performed after the CTN assembled wire is produced. However, part of the dispersing agent remains in the CNT assembled wire. Therefore, the mechanical strength of the CNT tends to be decreased.

In view of the above, it is an object of the present disclosure to provide a CNT assembled wire and a CNT assembled wire bundle, each of which has excellent mechanical strength.

Advantageous Effect of the Present Disclosure

According to the above embodiment, there can be provided a CNT assembled wire and a CNT assembled wire bundle, each of which has excellent mechanical strength.

DESCRIPTION OF EMBODIMENTS

First, embodiments of the present disclosure are listed and described.

(1) A carbon nanotube assembled wire according to one embodiment of the present disclosure is a carbon nanotube assembled wire including a plurality of carbon nanotubes, wherein in a Raman spectrum of the carbon nanotube assembled wire, a ratio IB/IA of an integrated intensity IA in a range of a Raman shift of 120 cm$^{-1}$ or more and 210 cm$^{-1}$ or less and an integrated intensity IB in a range of a Raman shift of more than 210 cm$^{-1}$ and 280 cm$^{-1}$ or less is 0.1 or more.

According to the above embodiment, a CNT assembled wire having excellent mechanical strength can be provided.

(2) The ratio IB/IA is preferably 0.1 or more and 10 or less.

According to this, the CNT assembled wire can have further excellent mechanical strength.

(3) In the carbon nanotube assembled wire, the plurality of carbon nanotubes are preferably oriented at a degree of orientation of 0.9 or more and 1 or less.

According to this, the CNT assembled wire can have further excellent mechanical strength.

(4) A carbon nanotube assembled wire bundle according to another embodiment of the present disclosure is a carbon nanotube assembled wire bundle including a plurality of the above-described carbon nanotube assembled wires, wherein
  in a Raman spectrum of the carbon nanotube assembled wire bundle, the ratio IB/IA of the integrated intensity IA in the range of the Raman shift of 120 cm$^{-1}$ or more and 210 cm$^{-1}$ or less and the integrated intensity IB in the range of the Raman shift of more than 210 cm$^{-1}$ and 280 cm$^{-1}$ or less is 0.1 or more,
  in the carbon nanotube assembled wire, the carbon nanotubes are oriented at a degree of orientation of 0.9 or more and 1 or less, and
  in the carbon nanotube assembled wire bundle, the carbon nanotube assembled wire is oriented at a degree of orientation of 0.8 or more and 1 or less.

According to the above embodiment, there can be provided a carbon nanotube assembled wire bundle having excellent mechanical strength.

(5) A twisting angle of the carbon nanotube assembled wire bundle is preferably 0° or more and 5° or less.

According to this, the CNT assembled wire bundle can have further excellent mechanical strength.

DETAILS OF EMBODIMENTS OF THE PRESENT DISCLOSURE

Specific examples of a carbon nanotube assembled wire and a carbon nanotube assembled wire bundle according to one embodiment of the present disclosure will be described below with reference to figures.

It should be noted that the same reference characters indicate the same or equivalent portions in the figures of the present disclosure. Further, a relation of such a dimension as a length, a width, a thickness, or a depth is modified as appropriate for clarity and brevity of the figures and does not necessarily represent an actual dimensional relation.

In the present specification, the expression "A to B" represents a range of lower to upper limits (i.e., A or more and B or less). When no unit is indicated for A and a unit is indicated only for B, the unit of A is the same as the unit of B. Moreover, the expression "the upper limit value of the range is C" means that the upper limit of the range is C or less, and the expression "the lower limit value of the range is D" means that the lower limit of the range is D or more.

First Embodiment: Carbon Nanotube Assembled Wire

<Carbon Nanotube Assembled Wire>

Figure 1:
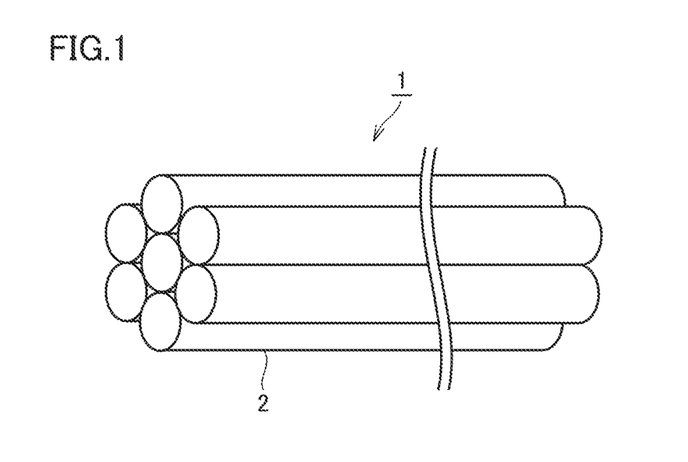
FIG. 1 is a diagram illustrating a representative exemplary configuration of a carbon nanotube assembled wire according to one embodiment of the present disclosure.

FIG. 1 is a diagram illustrating a representative exemplary configuration of a carbon nanotube assembled wire (hereinafter also referred to as "CNT assembled wire") in accordance with one embodiment of the present disclosure. As shown in FIG. 1, a carbon nanotube assembled wire 1 according to the present embodiment is a carbon nanotube assembled wire 1 including a plurality of carbon nanotubes 2, wherein in a Raman spectrum of carbon nanotube assembled wire 1, a ratio IB/IA of an integrated intensity IA in a range of a Raman shift of 120 cm$^{-1}$ or more and 210 cm$^{-1}$ or less and an integrated intensity IB in a range of a Raman shift of more than 210 cm$^{-1}$ and 280 cm$^{-1}$ or less is 0.1 or more.

(Raman Spectrum of CNT Assembled Wire)

In the Raman spectrum of the CNT assembled wire in one embodiment of the present disclosure, ratio IB/IA (hereinafter, also referred to as "integrated intensity ratio IB/IA") of integrated intensity IA in the range of the Raman shift of 120 cm$^{-1}$ or more and 210 cm$^{-1}$ or less and integrated intensity IB in the range of the Raman shift of more than 210 cm$^{-1}$ and 280 cm$^{-1}$ or less is 0.1 or more.

Integrated intensity IA in the range of the Raman shift of 120 cm$^{-1}$ or more and 210 cm$^{-1}$ or less originates from CNTs each having a diameter of more than 1.2 nm and 2.1 nm or less among the CNTs included in the CNT assembled wire. Integrated intensity IB in the range of the Raman shift of more than 210 cm$^{-1}$ and 280 cm$^{-1}$ or less originates from CNTs each having a diameter of 0.9 nm or more and 1.2 nm or less among the CNTs included in the CNT assembled wire. Therefore, it is indicated that as integrated intensity ratio IB/IA is larger, a ratio of the CNTs each having a diameter of 0.9 nm or more and 1.2 nm or less to the CNTs each having a diameter of more than 1.2 nm and 2.1 nm or less in the CNT assembled wire is larger.

As a result of diligent study by the present inventors, it was newly found that a CNT assembled wire has excellent breaking strength when integrated intensity ratio IB/IA is 0.1 or more. This is presumably due to the following reason: small-diameter CNTs are provided in a gap between the CNT assembled wires to result in an improved density, thereby suppressing slippage between adjacent CNTs.

The lower limit of integrated intensity ratio IB/IA is 0.1, preferably 0.5, and more preferably 1.0. The upper limit of integrated intensity ratio IB/IA is not particularly limited, but may be, for example, 10. Integrated intensity ratio IB/IA is 0.1 or more, preferably 0.1 or more and 10 or less, more preferably 0.5 or more and 10 or less, and still more preferably 1.0 or more and 10 or less.

Methods for measuring and evaluating the Raman spectrum of the CNT assembled wire in the present specification will be described in (A1) to (A3) below.

(A1) Measurement of Raman Spectrum

The Raman spectrum of the CNT assembled wire is obtained using the following apparatus and measurement conditions.

[Measurement Conditions for Raman Spectroscopic Analysis]

Raman spectroscopic apparatus: "inVia Raman microscope" (trademark) manufactured by Renishaw
Wavelength: 532 nm
Laser intensity: 0.3 mW
Magnification of objective lens: 50 times
Spot diameter: 1 μm (A2) Measurement of Integrated Intensity Under the above measurement conditions, a surface of one CNT assembled wire is scanned to obtain Raman spectra at 300 or more measurement points. The Raman spectrum at each measurement point is fitted by a Lorentz function to calculate a signal intensity, a position, and a full width at half maximum (FWHM). These values are used to calculate integrated intensity Ia in the range of the Raman shift of 120 $cm^{-1}$ or more and 210 $cm^{-1}$ or less and integrated intensity Ib in the range of the Raman shift of more than 210 $cm^{-1}$ and 280 $cm^{-1}$ or less in the Raman spectrum of each measurement point.

(A3) Calculation of Integrated Intensity Ratio IB/IA

Based on integrated intensities Ia and Ib of each of the 300 or more measurement points obtained in (A2), integrated intensity ratio Ib/Ia at each measurement point is calculated. The average value of integrated intensity ratios Ib/Ia at the 300 or more measurement points is calculated. The average value corresponds to integrated intensity ratio IB/IA.

(Shape of Carbon Nanotube)

The carbon nanotube can be a CNT of a known structure. Examples of the carbon nanotube that can be used include a single-layer carbon nanotube in which only a single carbon layer (graphene) has a cylindrical shape, a double-layer carbon nanotube or a multilayer carbon nanotube in which a stacked body of a plurality of carbon layers has a cylindrical shape, a cup stack-type nanotube having a structure in which graphenes in the shape of a bottomless paper cup are stacked, and the like.

Figure 2:
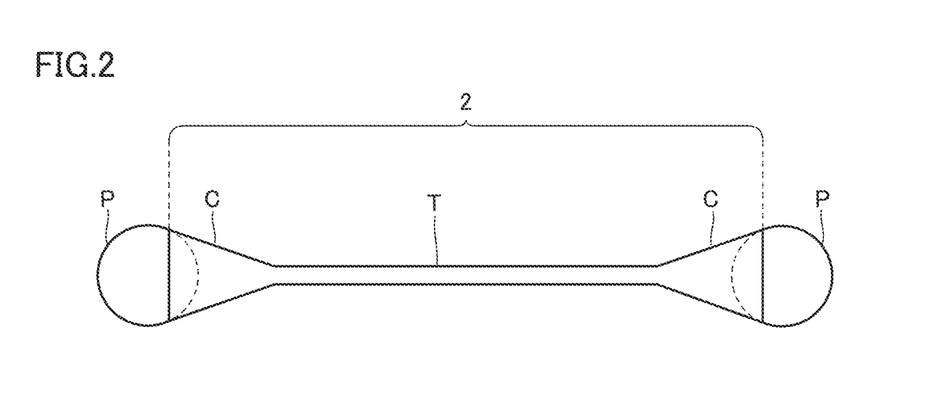
FIG. 2 is a diagram showing an exemplary carbon nanotube used in one embodiment of the present disclosure.

The shape of the carbon nanotube is not particularly limited, and both a carbon nanotube having closed ends and a carbon nanotube having opened ends can be used. Further, as shown in FIG. 2, a catalyst P, which is used in producing the carbon nanotube, may be adhered to one end or both ends of a tube portion T of carbon nanotube 2. In addition, a cone portion C made of a conical graphene may be formed at one end or both ends of tube portion T of carbon nanotube 2.

The length of the carbon nanotube can be selected as appropriate depending on the application. The length of the carbon nanotube is preferably 10 μm or more, and further preferably 100 μm or more, for example. In particular, when the length of the carbon nanotube is 100 μm or more, such a length is suitable from the viewpoint of producing the CNT assembled wire. Although the upper limit value for the length of the carbon nanotube is not particularly limited, it is preferably 600 mm or less from the viewpoint of manufacturing. The length of the CNT is preferably 10 μm or more and 600 mm or less, and further preferably 100 μm or more and 600 mm or less. The length of the CNT can be measured through observation with a scanning electron microscope.

The lower limit for the diameter of the carbon nanotube is preferably 0.6 nm, is more preferably 0.7 nm, and is still more preferably 0.8 nm. The upper limit for the diameter of the CNT is preferably 20 nm, is more preferably 10 nm, and is still more preferably 5 nm. The diameter of the CNT is preferably 0.6 nm or more and 20 nm or less, is more preferably 0.7 nm or more and 10 nm or less, and is further preferably 0.8 nm or more and 5 nm or less. Particularly, when the diameter of the carbon nanotube is 0.8 nm or more and 5 nm or less, such a diameter is suitable from the viewpoint of improvement in breaking strength due to high density of the CNT assembled wire.

In the present specification, the diameter of the carbon nanotube means an average outer diameter of one CNT. The CNT's average outer diameter is obtained by directly observing cross sections at two arbitrary positions of the CNT with a transmission electron microscope, measuring, in each cross section, an outer diameter, which is the distance between farthest two points on the outer circumference of the CNT, and calculating an average value of the obtained outer diameters. When the CNT includes the cone portion(s) at one end or both ends thereof, the diameter is measured at a location other than the cone portion(s).

(Shape of Carbon Nanotube Assembled Wire)

Carbon nanotube assembled wire 1 in accordance with the present embodiment includes the plurality of carbon nanotubes 2. The carbon nanotube assembled wire preferably has the shape of a yarn in which the plurality of carbon nanotubes are oriented and assembled together in their longitudinal direction.

The length of the carbon nanotube assembled wire is not particularly limited, and can be adjusted as appropriate depending on the application. The length of the CNT assembled wire is preferably 100 μm or more, more preferably 1000 μm or more, and further preferably 10 cm or more, for example. Although the upper limit value for the length of the CNT assembled wire is not particularly limited, it is preferably 1 m or less from the viewpoint of manufacturing. The length of the CNT assembled wire can be 100 μm or more and 1 m or less, 1000 μm or more and 1 m or less, and 10 cm or more and 1 m or less. The length of the CNT assembled wire can be measured through observation with a scanning electron microscope, an optical microscope, or visual observation.

The size of the diameter of the carbon nanotube assembled wire is not particularly limited, and can be adjusted as appropriate depending on the application. The diameter of the CNT assembled wire is preferably 0.1 μm or more, and further preferably 1 μm or more, for example. Although the upper limit value for the diameter of the CNT assembled wire is not particularly limited, it is preferably 100 μm or less from the viewpoint of manufacturing. The diameter of the CNT assembled wire can be 0.1 μm or more and 100 μm or less, or can be 1 μm or more and 100 μm or less. In the present embodiment, the size of the diameter of the CNT assembled wire is smaller than the length of the CNT assembled wire. That is, the direction of the length of the CNT assembled wire corresponds to the longitudinal direction.

In the present specification, the diameter of the carbon nanotube assembled wire means an average outer diameter of a single CNT assembled wire. The average outer diameter of a single CNT assembled wire is obtained by observing cross sections at two arbitrary positions of the single CNT assembled wire with a transmission electron microscope or a scanning electron microscope, measuring, in each cross section, an outer diameter, which is the distance between farthest two points on the outer circumference of the CNT assembled wire, and calculating an average value of the obtained outer diameters.

(Degree of Orientation)

In the CNT assembled wire in one embodiment of the present disclosure, the plurality of carbon nanotubes are preferably oriented at a degree of orientation of 0.9 or more and 1 or less.

In the present specification, the degree of orientation of the CNTs is a value calculated through the following procedure of steps (a1) to (a6).

(a1) Imaging CNT Assembled Wire

The CNT assembled wire is imaged using the following instrument under the following conditions.

Transmission electron microscope (TEM): "JEM2100" (trademark) manufactured by JEOL Ltd.

Conditions: a magnification of 50,000 times to 1.2 million times, and an acceleration voltage of 60 kV to 200 kV It should be noted that as measured by the applicants, as long as the measurement is performed in the same sample, even when results of measurement of the below-described degree of orientation are calculated a plurality of times with locations selected for fields of view for the measurement being changed, it has been confirmed that the measurement results are substantially not varied.

(a2) Binarizing Captured Image

The image captured in the above step (a1) is binarized through the following procedure using the following image processing program.

Image processing program: Non-destructive paper surface fiber orientation analysis program "FiberOri8single03" (http://www.enomae.com/FiberOri/index.htm)

Processing Procedure:
1. Histogram Average Brightness Correction
2. Background Removal
3. Binarization by Single Threshold
4. Luminance Inversion (a3) Fourier Transform of Binarized Image The image obtained in the above step (a2) is subjected to Fourier transform using the same image processing program as described above (i.e., Non-destructive paper surface fiber orientation analysis program "FiberOri8single03" (http://www.enomae.com/FiberOri/index.htm).

(a4) Calculating Angle of Orientation and Intensity of Orientation

In the Fourier-transformed image, with the X-axis having a positive direction represented as 0°, an average amplitude with respect to counterclockwise angle (θ°) is calculated.

From the Fourier transformed image, a graph is obtained which shows a relationship between the angle of orientation and the intensity of orientation.

(a5) Measuring Half Width

Based on the graph, a full width at half maximum (FWHM) is measured.

(a6) Calculating Degree of Orientation

Based on the full width at half maximum, the degree of orientation is calculated using the following equation (1).

$$\text{Degree of orientation} = (180° - \text{full width at half maximum})/180° \quad (1)$$

A degree of orientation of 0 means being fully non-oriented. A degree of orientation of 1 means being fully oriented.

In the carbon nanotube assembled wire in accordance with the present embodiment, the plurality of carbon nanotubes are oriented at a degree of orientation of 0.9 or more and 1.0 or less. This means that the CNT assembled wire of the present embodiment has the plurality of CNTs highly oriented. Thus, the CNT assembled wire in accordance with the present embodiment can be elongated while maintaining the CNT's characteristics in electrical conductivity and mechanical strength.

When the degree of orientation of the CNTs in the CNT assembled wire is less than 0.9, the electrical conductivity and mechanical strength tends to be reduced. The lower limit value for the degree of orientation is preferably 0.93, more preferably 0.94, and still more preferably 0.95. The upper limit value for the degree of orientation is preferably 0.99, and more preferably 1. The degree of orientation of the CNTs in the CNT assembled wire can be 0.93 or more and 0.99 or less, 0.94 or more and 0.99 or less, 0.95 or more and 0.99 or less, 0.93 or more and 1 or less, 0.94 or more and 1 or less, or 0.95 or more and 1 or less.

(D/G Ratio of Carbon Nanotube)

The carbon nanotube preferably has a D/G ratio of 0.1 or less, the D/G ratio being a ratio of a peak intensity of a D band to a peak intensity of a G band in a Raman spectroscopic analysis with a wavelength of 532 nm.

The G band is a peak originating in the CNT seen in the vicinity of a Raman shift of 1590 $cm^{-1}$ in a Raman spectrum obtained through Raman spectroscopy. The D band is a peak originating in amorphous carbon or a defect in graphite or the CNT seen in the vicinity of a Raman shift of 1350 $cm^{-1}$ in the Raman spectrum obtained through Raman spectroscopy. Therefore, it is indicated that as the D/G ratio has a smaller value, the carbon nanotube has a higher crystallinity and the carbon nanotube contains a smaller amount of amorphous carbon or graphite having defects.

When the D/G ratio of the CNT is 0.1 or less, an amount of the amorphous carbon or graphite having defects is small, and hence crystallinity is high. Thus, the CNT can have high tensile strength and high electrical conductivity. If the D/G ratio of the CNT exceeds 0.1, the CNT may be unable to have sufficient tensile strength and high electrical conductivity. The D/G ratio is preferably 0.1 or less, and more preferably 0.01 or less. Although the lower limit value for the D/G ratio is not particularly limited, it can be 0 or more, for example. The D/G ratio of the CNT can be 0 or more and 0.1 or less, or 0 or more and 0.01 or less.

In the present specification, the D/G ratio of each carbon nanotube in the carbon nanotube assembled wire is a value measured in the following method.

The carbon nanotube assembled wire is subjected to Raman spectroscopic analysis under the following conditions to obtain a Raman spectrum (hereinafter also referred to as the Raman spectrum of the CNT assembled wire). The D/G ratio is calculated from a peak intensity of the D band and a peak intensity of the G band in the Raman spectrum of the CNT assembled wire. The D/G ratio of the CNT assembled wire is regarded as the D/G ratio of each carbon nanotube in the carbon nanotube assembled wire.

[Measurement Conditions for Raman Spectroscopic Analysis]

Raman spectroscopic apparatus: "inVia Raman microscope" (trademark) manufactured by Renishaw
Wavelength: 532 nm
Laser intensity: 17 mW
Exposure time: one second
Average number of times: three times
Magnification of objective lens: 50 times The reason for regarding that the D/G ratio of each CNT in the CNT assembled wire in accordance with the present embodiment is the same as the D/G ratio of the CNT assembled wire is as follows:

The present inventors subjected a plurality of carbon nanotubes before being assembled together to Raman spectroscopic analysis under the same conditions as those described above to obtain a Raman spectrum (hereinafter also referred to as a CNT Raman spectrum). A D/G ratio was calculated from a peak intensity of the D band and a peak intensity of the G band in each of a plurality of obtained CNT Raman spectra.

Subsequently, the carbon nanotubes were assembled together to prepare a CNT assembled wire. The CNT assembled wire was subjected to a Raman spectroscopic analysis under the above conditions to obtain a Raman spectrum (hereinafter also referred to as a Raman spectrum of the CNT assembled wire). A D/G ratio was calculated from a peak intensity of the D band and a peak intensity of the G band in the Raman spectrum of the CNT assembled wire.

It has been confirmed that a value obtained by averaging data in D/G ratio of the plurality of carbon nanotubes before being assembled together, as calculated above, is substantially equal to that of the D/G ratio of the CNT assembled wire. This indicates that the D/G ratio of the carbon nanotubes before being assembled together is maintained in the CNTs in the CNT assembled wire. Therefore, in the present specification, the D/G ratio of each carbon nanotube in the CNT assembled wire can be regarded as the same as the D/G ratio of the CNT before being assembled together.

(Elements Originating from Catalyst)

Preferably, the carbon nanotube assembled wire includes at least one type of metal element selected from the group consisting of iron, nickel, cobalt, molybdenum, gold, silver, copper, yttrium, chromium, palladium, platinum and tungsten, and the metal element is dispersed in the carbon nanotube assembled wire in the longitudinal direction thereof. Herein, the metal element dispersed in the CNT assembled wire in the longitudinal direction thereof means that the metal element is not localized in the CNT assembled wire in the longitudinal direction thereof.

These metal elements originate from a catalyst (ferrocene (Fe($C_5H_5$)$_2$), nickelocene (Ni($C_5H_5$)$_2$), cobaltocene (Co($C_5H_5$)$_2$), or the like) when the catalyst is used in manufacturing the CNT assembled wire. When these metal elements are dispersed and present in the CNT assembled wire in the longitudinal direction thereof, the metal elements do not affect the CNT's characteristics in electrical conductivity, and the CNT assembled wire can be elongated while maintaining the electrical conductivity that the CNT assembled wire intrinsically has.

What type of metal element is included in the CNT assembled wire and how much the former is contained in the latter can be confirmed and measured through energy dispersive X-ray spectrometry (EDX). A total content of the metal elements in the CNT assembled wire is preferably 0.1% or more and 50% or less, more preferably 1% or more and 40% or less, and still more preferably 5% or more and 20% or less based on atomicity.

The fact that the metal element is dispersed in the CNT assembled wire in the longitudinal direction thereof can be confirmed through EDX, electron energy loss spectrometry (EELS) or the like, which can perform measurement at the same time as an electron microscope such as SEM and TEM.

Preferably, the carbon nanotube assembled wire includes an element of sulfur, and the element of sulfur is dispersed in the carbon nanotube assembled wire in the longitudinal direction thereof. Herein, the element of sulfur dispersed in the CNT assembled wire in the longitudinal direction thereof means that the element of sulfur is not localized in the CNT assembled wire in the longitudinal direction thereof.

The element of sulfur originates from an assistive catalyst ($CS_2$) when the assistive catalyst is used in manufacturing the CNT assembled wire. When the element of sulfur is dispersed and present in the CNT assembled wire in the longitudinal direction thereof, the element of sulfur does not affect the CNT's characteristics in electrical conductivity and mechanical strength, and the CNT assembled wire can be elongated while maintaining these characteristics.

The fact that the CNT assembled wire includes the element of sulfur, and the content of the element of sulfur in the CNT assembled wire can be confirmed and measured through EDX, thermogravimetry, and X-ray photoelectron spectroscopy. The content of the element of sulfur in the CNT assembled wire is preferably 0.1% or more and 20% or less, more preferably 1% or more and 15% or less, and still more preferably 2% or more and 10% or less based on atomicity.

The fact that the element of sulfur is dispersed in the CNT assembled wire in the longitudinal direction thereof can be confirmed by EDX, EELS or the like, which can perform measurement at the same time as an electron microscope such as SEM and TEM.

(Method for Manufacturing CNT Assembled Wire)

Figure 11:
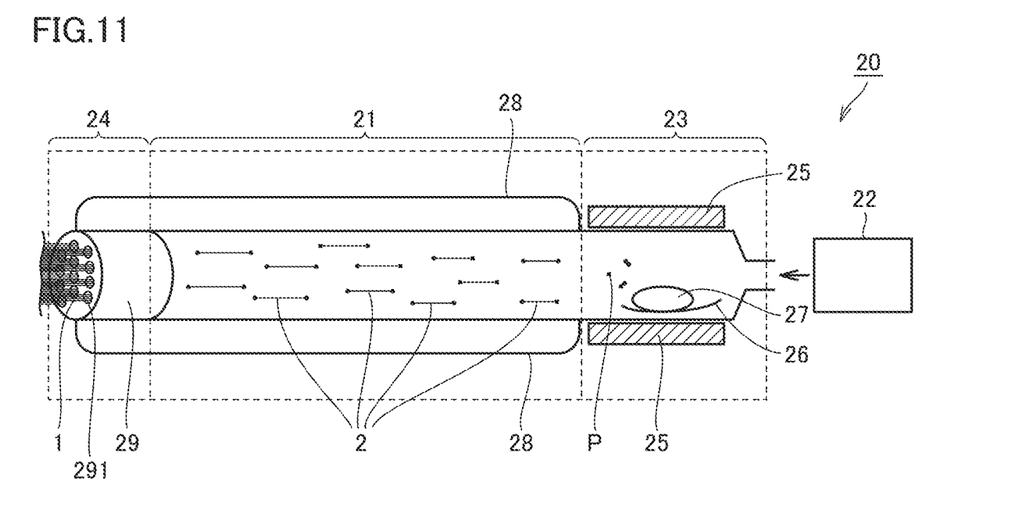
FIG. 11 is a diagram illustrating a representative exemplary configuration of a carbon nanotube assembled wire manufacturing apparatus according to one embodiment of the present disclosure.

The carbon nanotube assembled wire according to the present embodiment can be manufactured by the following method using, for example, a carbon nanotube assembled wire manufacturing apparatus 20 shown in FIG. 11.

Carbon nanotube assembled wire manufacturing apparatus 20 can include: a tubular carbon nanotube growing unit (hereinafter also referred to as a CNT growing unit) 21; a gas supplying unit 22 that supplies a carbon-containing gas into CNT growing unit 21 via one end of CNT growing unit 21 (in FIG. 11, a right end thereof); a catalyst supplying unit 23 that supplies catalyst particles P into CNT growing unit 21; and a carbon nanotube assembling unit (hereinafter also referred to as a CNT assembling unit) 24 that is disposed at the other end of CNT growing unit 21 (in FIG. 11, a left end thereof) and orients and assembles a plurality of carbon nanotubes that are obtained in CNT growing unit 21 together in a direction along a flow of the carbon-containing gas.

The catalyst supplying unit is heated by a heater 25. Carbon nanotube growing unit 21 is disposed in an electric furnace 28 and heated by a heater (not shown). Carbon nanotube assembling unit 24 is provided with a honeycomb structure 29. Honeycomb structure 29 is a porous body having a large number of narrow tubular through holes 291, and each through hole has a cross sectional area of 0.01 mm$^2$ or more and 4 mm$^2$ or less and has a length of 10 mm or more and 200 mm or less.

The electric furnace's internal temperature was raised to 1000° C. while supplying argon gas from gas supplying unit 22 into catalyst supplying unit 23. Subsequently, in addition to the argon gas, methane gas and carbon disulfide ($CS_2$) gas are supplied.

By supplying the argon gas, the methane gas, and the carbon disulfide gas, a catalyst 27 disposed on a catalyst holder 26 is disintegrated to discharge catalyst particles into CNT growing unit 21. By supplying the carbon-containing gas from gas supplying unit 22 to the catalyst particles in CNT growing unit 21 through catalyst supplying unit 23, carbon nanotubes 2 are grown from catalyst particles P.

Carbon nanotubes 2 pass through through holes 291 of honeycomb structure 29 provided in CNT assembling unit 24. On this occasion, a tensile force acts on an end of CNT 2, and the CNT is pulled while extending from catalyst particles P, and thus drawn in the longitudinal direction while it is plastically deformed and reduced in diameter. It should be noted that the tensile force results from a change in the flow rate of the carbon-containing gas.

When the plurality of CNTs 2 pass through the through holes of honeycomb structure 29, CNTs 2 are oriented and assembled in the direction along the flow of the carbon-containing gas, thereby forming a carbon nanotube assembled wire.

Second Embodiment: Carbon Nanotube Assembled Wire Bundle

Figure 3:
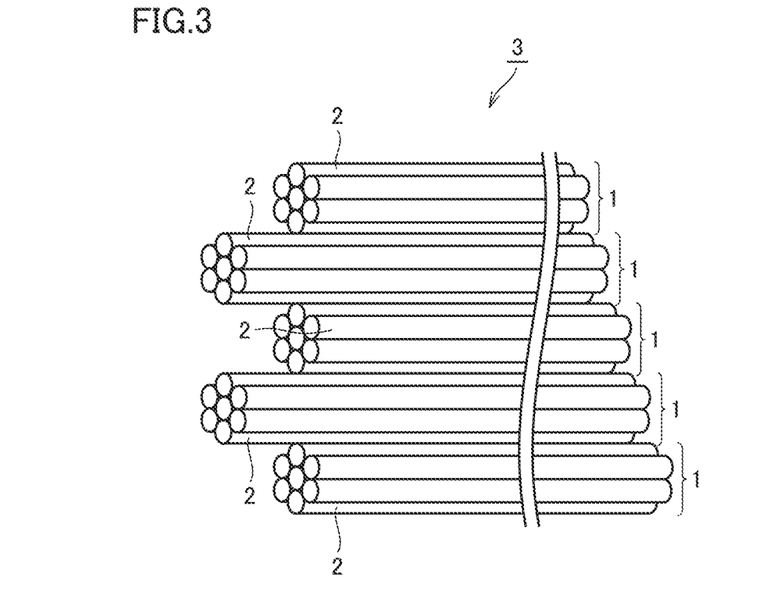
FIG. 3 is a diagram illustrating a representative exemplary configuration of a carbon nanotube assembled wire bundle according to one embodiment of the present disclosure.

FIG. 3 is a diagram illustrating a representative exemplary configuration of a carbon nanotube assembled wire bundle (hereinafter, also referred to as "CNT assembled wire bundle") according to one embodiment of the present disclosure. As shown in FIG. 3, carbon nanotube assembled wire bundle 3 according to the present embodiment includes a plurality of carbon nanotube assembled wires 1, wherein in a Raman spectrum of the carbon nanotube assembled wire bundle, ratio IB/IA of integrated intensity IA in the range of the Raman shift of 120 $cm^{-1}$ or more and 210 $cm^{-1}$ or less and integrated intensity IB in the range of the Raman shift of more than 210 $cm^{-1}$ and 280 $cm^{-1}$ or less is 0.1 or more, in carbon nanotube assembled wire 1, carbon nanotubes 2 are oriented at a degree of orientation of 0.9 or more and 1 or less, and in carbon nanotube assembled wire bundle 3, carbon nanotube assembled wires 1 are oriented at a degree of orientation of 0.8 or more and 1 or less.

(Configuration of Carbon Nanotube Assembled Wire Bundle)

As each carbon nanotube assembled wire 1 included in carbon nanotube assembled wire bundle 3, the CNT assembled wire of the first embodiment can be used. As each carbon nanotube 2 included in CNT assembled wire 1, the same carbon nanotube as that described in the first embodiment can be used.

(Raman Spectrum)

In the Raman spectrum of the CNT assembled wire bundle in one embodiment of the present disclosure, ratio IB/IA (hereinafter, also referred to as "integrated intensity ratio IB/IA") of integrated intensity IA in the range of the Raman shift of 120 $cm^{-1}$ or more and 210 $cm^{-1}$ or less and integrated intensity IB in the range of the Raman shift of more than 210 $cm^{-1}$ and 280 $cm^{-1}$ or less is 0.1 or more.

Integrated intensity IA in the range of the Raman shift of 120 $cm^{-1}$ or more and 210 $cm^{-1}$ or less originates from CNTs each having a diameter of more than 1.2 nm and 2.1 nm or less among the CNTs included in the CNT assembled wire bundle. Integrated intensity IB in the range of the Raman shift of more than 210 $cm^{-1}$ and 280 $cm^{-1}$ or less originates from CNTs each having a diameter of 0.9 nm or more and 1.2 nm or less among the CNTs included in the CNT assembled wire bundle. Therefore, it is indicated that as integrated intensity ratio IB/IA is larger, the ratio of the CNTs each having a diameter of 0.9 nm or more and 1.2 nm or less to the CNTs each having a diameter of more than 1.2 nm and 2.1 nm or less is larger in the CNT assembled wire bundle.

As a result of diligent study by the present inventors, it was newly found that when integrated intensity ratio IB/IA is 0.1 or more, the CNT assembled wire bundle has excellent breaking strength. This is presumably due to the following reason: small-diameter CNTs are provided in a gap between the CNT assembled wires to result in an improved density, thereby suppressing slippage between adjacent CNTs.

The lower limit of integrated intensity ratio IB/IA is 0.1, preferably 0.5, and more preferably 1.0. The upper limit of integrated intensity ratio IB/IA is not particularly limited, but can be, for example, 10. Integrated intensity ratio IB/IA is 0.1 or more, preferably 0.1 or more and 10 or less, more preferably 0.5 or more and 10 or less, and still more preferably 1.0 or more and 10 or less.

Methods for measuring and evaluating the Raman spectrum of the CNT assembled wire bundle in the present specification are the same as the methods for measuring and evaluating the Raman spectrum of the CNT assembled wire described in the first embodiment except that the measurement target is the CNT assembled wire bundle, and therefore will not be described repeatedly.

Figure 4:
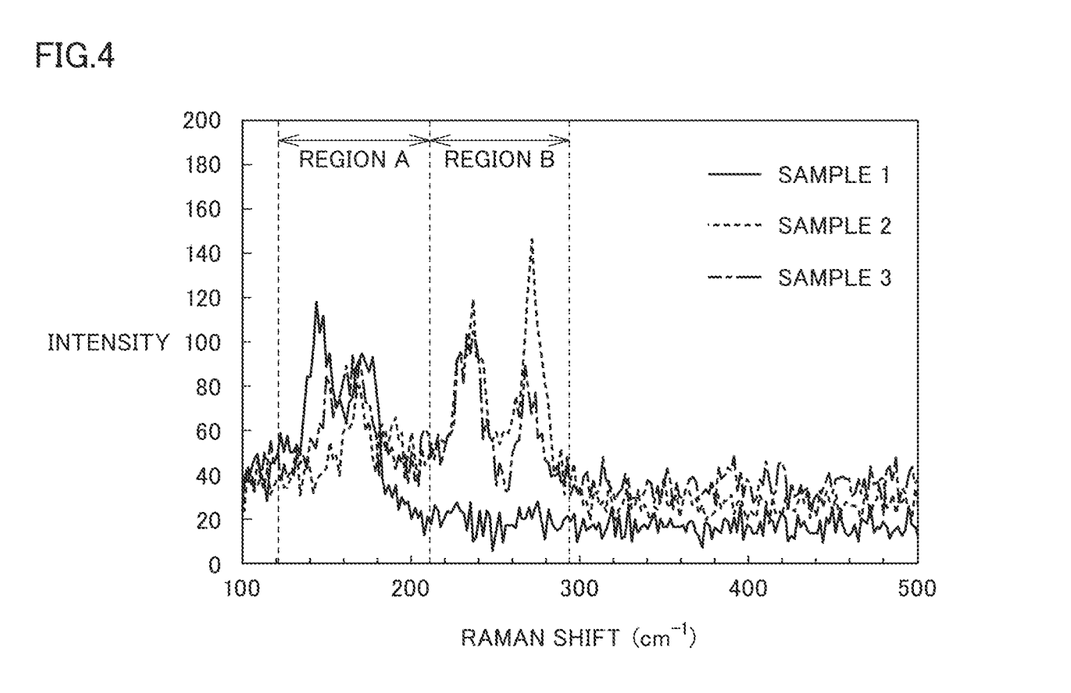
FIG. 4 is a diagram showing a Raman spectrum of the carbon nanotube assembled wire bundle according to one embodiment of the present disclosure.

FIG. 4 shows a Raman spectrum of a CNT assembled wire bundle produced in an example described later. In FIG. 4, each of samples 2 and 3 is an example of the present disclosure and corresponds to the CNT assembled wire bundle of the present embodiment. In FIG. 4, the range of the Raman shift of 120 $cm^{-1}$ or more and 210 $cm^{-1}$ or less is indicated as a region A, and the range of the Raman shift of more than 210 $cm^{-1}$ and 280 $cm^{-1}$ or less is indicated as a region B. In each of samples 2 and 3, three peaks were observed.

It should be noted that when the applicants compared integrated intensity ratio IB/IA in the CNT assembled wire bundle with integrated intensity ratio IB/IA in the CNT assembled wire included in the CNT assembled wire bundle, it was confirmed that the both indicate substantially the same value. Therefore, in the present specification, integrated intensity ratio IB/IA in the CNT assembled wire bundle can also be regarded as integrated intensity ratio IB/IA in the CNT assembled wire included in the CNT assembled wire bundle.

(Degree of Orientation)

In the carbon nanotube assembled wire bundle in accordance with the present embodiment, the carbon nanotubes are oriented at a degree of orientation of 0.9 or more and 1 or less in the carbon nanotube assembled wire, and carbon nanotube assembled wires 1 are oriented at a degree of orientation of 0.8 or more and 1 or less in the carbon nanotube assembled wire bundle. This means that the CNT assembled wire bundle of the present embodiment has the CNTs and CNT assembled wires highly oriented. Thus, the CNT assembled wire bundle in accordance with the present embodiment can be elongated while maintaining the CNT's characteristics in electrical conductivity and mechanical strength.

When the degree of orientation of the CNTs in the CNT assembled wire is less than 0.9, the electrical conductivity and mechanical strength tends to be reduced. The lower limit value for the degree of orientation is 0.9, preferably 0.93, more preferably 0.94, and still more preferably 0.95. The upper limit value for the degree of orientation is preferably 0.99, and more preferably 1. The degree of orientation of the CNTs in the CNT assembled wire can be 0.93 or more and 0.99 or less, 0.94 or more and 0.99 or less, 0.95 or more and 0.99 or less, 0.93 or more and 1 or less, 0.94 or more and 1 or less, or 0.95 or more and 1 or less.

When the degree of orientation of the CNT assembled wires in the CNT assembled wire bundle is less than 0.8, the electrical conductivity and mechanical strength tends to be reduced. The lower limit value for the degree of orientation is 0.8, preferably 0.83, and more preferably 0.85. The upper limit value for the degree of orientation is preferably 0.95, and more preferably 1. The degree of orientation of the CNT assembled wires in the CNT assembled wire bundle can be 0.8 or more and 0.95 or less, 0.83 or more and 0.95 or less, 0.85 or more and 0.95 or less, 0.8 or more and 1 or less, 0.83 or more and 1 or less, or 0.85 or more and 1 or less.

The degree of orientation of the CNT in the carbon nanotube assembled wire has a value calculated in a method similar to the method described in the first embodiment for calculating the degree of orientation of the carbon nanotube in the carbon nanotube assembled wire, and accordingly, will not be described repeatedly.

The degree of orientation of the CNT assembled wire in the carbon nanotube assembled wire bundle is basically a value calculated through a procedure similar to that of steps (a1) to (a6) described in the first embodiment for a method for calculating a degree of orientation. What is different is that, in step (a1), the CNT assembled wire bundle is imaged using the following equipment under the following conditions.

Scanning electron microscopy (SEM): Cry-10 (trademark) manufactured by Technex Lab Co., Ltd.

Imaging condition: a magnification of 40 to 100,000 times, and an acceleration voltage of 1 kV to 17 kV Except for the steps other than the above step, the method is the same as the method described in the method for calculating the degree of orientation in the first embodiment and therefore will not be described repeatedly.

(Shape)

The carbon nanotube assembled wire bundle has the shape of a string in which a plurality of carbon nanotube assembled wires are oriented and assembled together in their longitudinal direction. The fact that the CNT assembled wire bundle has the shape of a string in which a plurality of carbon nanotube assembled wires are oriented and assembled together in their longitudinal direction can be confirmed by observation with an optical microscope or a scanning electron microscope.

The length of the carbon nanotube assembled wire bundle is not particularly limited, and can be adjusted as appropriate depending on the application. The length of the CNT assembled wire bundle is preferably 100 µm or more, more preferably 1000 µm or more, and further preferably 10 cm or more, for example. Although the upper limit value for the length of the CNT assembled wire bundle is not particularly limited, it is preferably 1 m or less from the viewpoint of manufacturing. The length of the CNT assembled wire bundle is preferably 100 µm or more and 1 m or less, 1000 µm or more and 1 m or less, or 10 cm or more and 1 m or less. The length of the CNT assembled wire bundle can be measured through observation with an optical microscope or visual observation.

The size of the diameter of the carbon nanotube assembled wire bundle is not particularly limited, and can be adjusted as appropriate depending on the application. The diameter of the CNT assembled wire bundle is preferably 1 µm or more, and further preferably 10 µm or more, for example. Although the upper limit value for the diameter of the CNT assembled wire bundle is not particularly limited, it is preferably 1000 µm or less from the viewpoint of manufacturing. The diameter of the CNT assembled wire bundle is preferably 1 µm or more and 1000 µm or less, more preferably 10 µm or more and 1000 µm or less. In the present embodiment, the size of the diameter of the CNT assembled wire bundle is smaller than the length of the CNT assembled wire bundle.

In the present specification, the diameter of the carbon nanotube assembled wire bundle means an average outer diameter of a single CNT assembled wire bundle. The average outer diameter of a single CNT assembled wire bundle is obtained by observing cross sections at two arbitrary positions of the single CNT assembled wire bundle with an optical microscope, measuring, in each cross section, an outer diameter, which is the distance between farthest two points on the outer circumference of the CNT assembled wire bundle, and calculating an average value of the obtained outer diameters.

(Twisting Angle)

A twisting angle of the carbon nanotube assembled wire bundle is preferably 0° or more and 5° or less. According to this, the CNT assembled wire bundle can have further excellent mechanical strength. Here, the twisting angle of the carbon nanotube assembled wire bundle means an angle of carbon nanotube assembled wire 1 with respect to the longitudinal direction of carbon nanotube assembled wire bundle 3. It should be noted that the twisting angle is measured by using an optical microscope, and the measurement is performed with the CNT assembled wire bundle being placed such that the longitudinal direction of the CNT assembled wire bundle is in a straight line.

The twisting angle of the carbon nanotube assembled wire bundle is more preferably 0° or more and 4° or less, and is still more preferably 0° or more and 3° or less.

(Method for Manufacturing Carbon Nanotube Assembled Wire Bundle)

Figure 12:
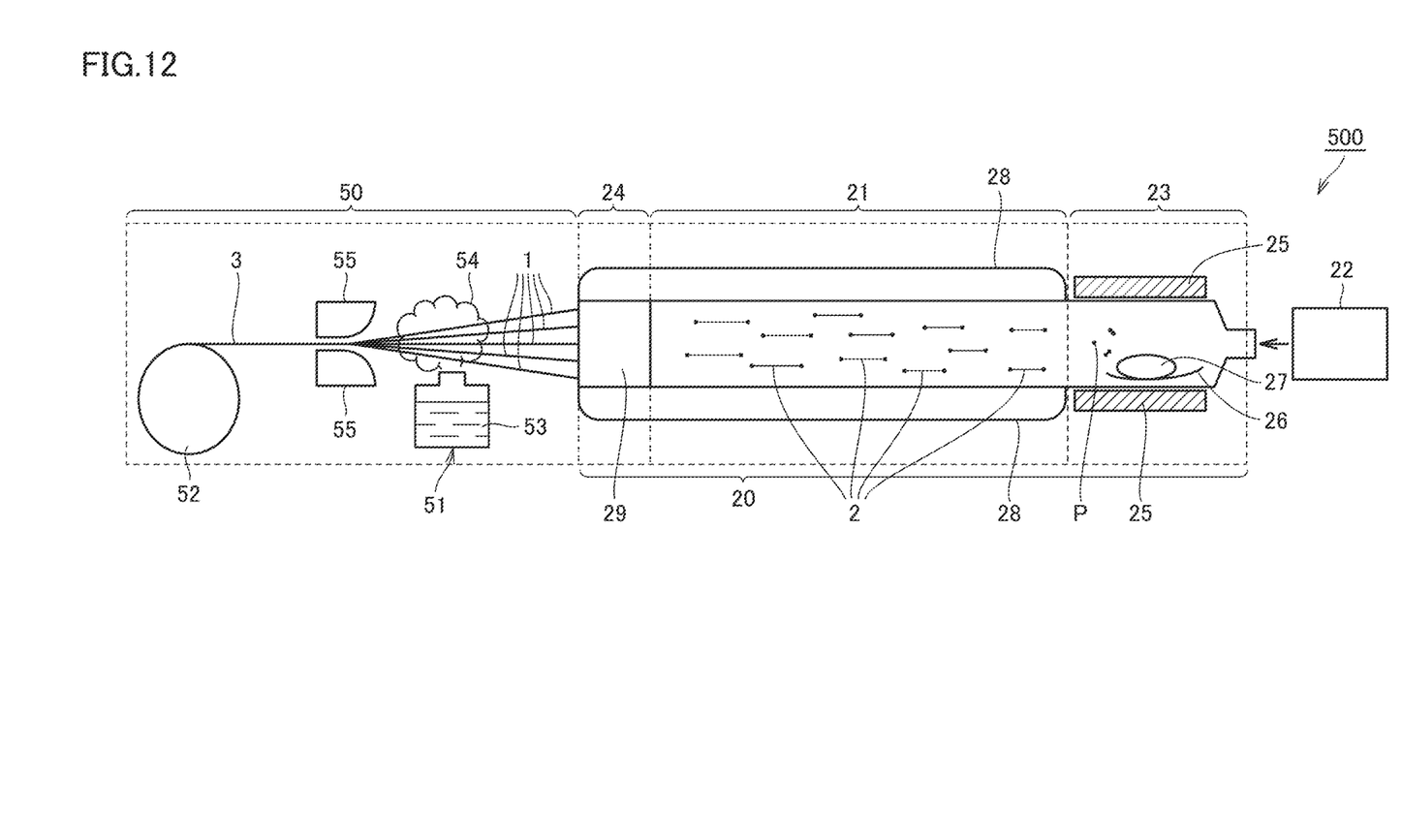
FIG. 12 is a diagram illustrating a representative exemplary configuration of a carbon nanotube assembled wire bundle manufacturing apparatus according to one embodiment of the present disclosure.

The carbon nanotube assembled wire bundle according to the present embodiment can be manufactured using, for example, a carbon nanotube assembled wire bundle manufacturing apparatus 500 shown in FIG. 12.

Carbon nanotube assembled wire bundle manufacturing apparatus 500 can include: carbon nanotube assembled wire manufacturing apparatus 20 described in the first embodiment; and a bundling unit 50 that bundles a plurality of carbon nanotube assembled wires obtained by the carbon nanotube assembled wire manufacturing apparatus, in the direction along the longitudinal direction of each of the plurality of carbon nanotube assembled wires so as to obtain a carbon nanotube assembled wire bundle.

Bundling unit 50 can include: a liquid adhering apparatus 51 that adheres a volatile liquid 53 to carbon nanotube assembled wire 1; a constriction 55 disposed on the downstream with respect to liquid adhering apparatus 51; and a reeling apparatus 52 that orients, bundles, and reels the plurality of carbon nanotube assembled wires in the direction along the longitudinal direction of each of the plurality of carbon nanotube assembled wires while applying tension to the plurality of carbon nanotube assembled wires. Examples of the volatile liquid include methanol, ethanol, isopropyl alcohol, acetone, methyl ethyl ketone, xylene, anisole, toluene, cresol, pyrrolidone, carbitol, carbitol acetate, water, epoxy monomer, and acrylic monomer. The volatile liquid includes a monomer or a resin.

First, a plurality of CNT assembled wires 1 are obtained by the same method as the method for manufacturing the CNT assembled wires according to the first embodiment. Volatile liquid 53 is adhered to the plurality of CNT assembled wires 1. As a method for adhering volatile liquid 53 to carbon nanotube assembled wires 1, for example, volatile liquid 53 is atomized into vapor 54 and vapor 54 is sprayed onto the carbon nanotube assembled wire. It should be noted that the volatile liquid is then evaporated.

Next, the plurality of carbon nanotube assembled wires 1 are caused to pass through constriction 55 while tension is applied thereto by reeling apparatus 52, thereby orienting and assembling carbon nanotube assembled wires 1 in the longitudinal direction. In this way, CNT assembled wire bundle 3 is formed.

[Additional Note 1]

In the Raman spectrum of the carbon nanotube assembled wire of the present disclosure, ratio IB/IA of integrated intensity IA in the range of the Raman shift of 120 cm$^{-1}$ or more and 210 cm$^{-1}$ or less and integrated intensity IB in the range of the Raman shift of more than 210 cm$^{-1}$ and 280 cm$^{-1}$ or less is preferably 0.1 or more and 10 or less.

Ratio IB/IA is preferably 0.5 or more and 10 or less.

Ratio IB/IA is preferably 1.0 or more and 10 or less.

[Additional Note 2]

In the carbon nanotube assembled wire of the present disclosure, the length of the carbon nanotube is preferably 10 μm or more and 600 mm or less.

The length of the carbon nanotube is preferably 100 μm or more and 600 mm or less.

[Additional Note 3]

In the carbon nanotube assembled wire of the present disclosure, the diameter of the carbon nanotube is preferably 0.6 nm or more and 20 nm or less.

The diameter of the carbon nanotube is preferably 0.7 nm or more and 10 nm or less.

The diameter of the carbon nanotube is preferably 0.8 nm or more and 5 nm or less.

[Additional Note 4]

The length of the carbon nanotube assembled wire of the present disclosure is preferably 100 μm or more and 1 m or less.

The length of the carbon nanotube assembled wire is preferably 1000 μm or more and 1 m or less.

The length of the carbon nanotube assembled wire is preferably 10 cm or more and 1 m or less.

[Additional Note 5]

The diameter of the carbon nanotube assembled wire of the present disclosure is preferably 0.1 μm or more and 100 μm or less.

The diameter of the carbon nanotube assembled wire is preferably 1 μm or more and 100 μm or less.

[Additional Note 6]

In the CNT assembled wire of the present disclosure, the carbon nanotubes are preferably oriented at a degree of orientation of 0.93 or more and 0.99 or less.

The degree of orientation is preferably 0.94 or more and 0.99 or less.

The degree of orientation is preferably 0.95 or more and 0.99 or less.

The degree of orientation is preferably 0.93 or more and 1 or less.

The degree of orientation is preferably 0.94 or more and 1 or less.

The degree of orientation is preferably 0.95 or more and 1 or less.

[Additional Note 6]

In the Raman spectrum of the carbon nanotube of the present disclosure, ratio D/G of peak intensity G at the Raman shift of 1590±20 cm$^{-1}$ and peak intensity D at the Raman shift of 1350±20 cm$^{-1}$ is preferably 0 or more and 0.1 or less.

Ratio D/G is preferably 0 or more and 0.01 or less.

[Additional Note 7]

In the Raman spectrum of the carbon nanotube assembled wire bundle of the present disclosure, ratio IB/IA of integrated intensity IA in the range of the Raman shift of 120 cm$^{-1}$ or more and 210 cm$^{-1}$ or less and integrated intensity IB in the range of the Raman shift of more than 210 cm$^{-1}$ and 280 cm$^{-1}$ or less is preferably 0.1 or more and 10 or less.

Ratio IB/IA is preferably 0.5 or more and 10 or less.

Ratio IB/IA is preferably 1.0 or more and 10 or less.

[Additional Note 8]

In the carbon nanotube assembled wire in the carbon nanotube assembled wire bundle of the present disclosure, the carbon nanotubes are preferably oriented at a degree of orientation of 0.93 or more and 0.99 or less.

The degree of orientation of the carbon nanotubes is preferably 0.94 or more and 0.99 or less.

The degree of orientation of the carbon nanotubes is preferably 0.95 or more and 0.99 or less.

The degree of orientation of the carbon nanotubes is preferably 0.93 or more and 1 or less.

The degree of orientation of the carbon nanotubes is preferably 0.94 or more and 1 or less.

The degree of orientation of the carbon nanotubes is preferably 0.95 or more and 1 or less.

[Additional Note 9]

In the carbon nanotube assembled wire bundle of the present disclosure, the degree of orientation of the carbon nanotube assembled wires is preferably 0.8 or more and 0.95 or less.

The degree of orientation of the carbon nanotube assembled wires is preferably 0.83 or more and 0.95 or less.

The degree of orientation of the carbon nanotube assembled wires is preferably 0.85 or more and 0.95 or less.

The degree of orientation of the carbon nanotube assembled wires is preferably 0.8 or more and 1 or less.

The degree of orientation of the carbon nanotube assembled wires is preferably 0.83 or more and 1 or less.

The degree of orientation of the carbon nanotube assembled wires is preferably 0.85 or more and 1 or less.

[Additional Note 10]

The carbon nanotube assembled wire bundle of the present disclosure preferably has a length of 100 μm or more and 1 m or less.

The carbon nanotube assembled wire bundle preferably has a length of 1000 μm or more and 1 m or less.

The carbon nanotube assembled wire bundle preferably has a length of 10 cm or more and 1 m or less.

[Additional Note 11]

The diameter of the carbon nanotube assembled wire bundle of the present disclosure is preferably 1 μm or more and 1000 μm or less.

The diameter of the carbon nanotube assembled wire bundle is preferably 10 μm or more and 1000 μm or less.

[Additional Note 12]

The twisting angle of the carbon nanotube assembled wire bundle of the present disclosure is preferably 0° or more and 4° or less.

The twisting angle of the carbon nanotube assembled wire bundle is preferably 0° or more and 3° or less.

EXAMPLES

The following describes the present embodiment more specifically by way of examples. However, the present embodiment is not limited by these examples.

<Preparing Carbon Nanotube Assembled Wire Bundle Manufacturing Apparatus>

(Apparatus 1)

As an apparatus 1, a carbon nanotube assembled wire bundle manufacturing apparatus having a configuration similar to that of the carbon nanotube assembled wire bundle manufacturing apparatus outlined in FIG. 12 was prepared. Specifically, carbon nanotube growing unit 21 and carbon nanotube assembling unit 24 are disposed in electric furnace 28. The CNT growing unit is a quartz tube having an inner diameter of 20 mm and a length of 800 mm. As carbon nanotube assembling unit 24, a ceramic honeycomb structure is disposed in a quartz tube in communication with the CNT growing unit. The honeycomb structure has about 200 through holes per inch (200 cpsi), and each through hole has an area in cross section of 1.96 mm².

Catalyst supplying unit 23 is disposed on a side of CNT growing unit 21 opposite to a side thereof in communication with CNT assembling unit 24. Catalyst supplying unit 23 is a quartz tube having an inner diameter of 20 mm and a length of 200 mm, and is disposed in communication with the CNT growing unit. In catalyst supplying unit 23, ferrocene is disposed as a catalyst on catalyst holder 26. Catalyst supplying unit 23 is heated by heater 25.

Gas supplying unit 22 is disposed on a side of catalyst supplying unit 23 opposite to a side thereof connected to CNT growing unit 21.

Liquid adhering apparatus 51 that adheres volatile liquid 53, constriction 55, and reeling apparatus 52 are disposed on the downstream side with respect to CNT assembling unit 24. In liquid adhering apparatus 51, ethanol is sealed as volatile liquid 53.

(Apparatus 2)

As an apparatus 2, an apparatus having a configuration basically similar to that of apparatus 1 was prepared. In apparatus 2, the honeycomb structure has 400 through holes per inch (400 cpsi), and each through hole has an area in cross section of 1.21 mm².

(Apparatus 3)

As an apparatus 3, an apparatus having a configuration basically similar to that of apparatus 1 was prepared. In apparatus 3, honeycomb structure has 600 through holes per inch (600 cpsi), and each through hole has an area in cross section of 0.81 mm².

<Producing Carbon Nanotube Assembled Wire and Carbon Nanotube Assembled Wire Bundle>

Carbon nanotube assembled wire bundles of samples 1 to 3 were produced using manufacturing apparatuses that are apparatuses 1 to 3, respectively. Initially, in each of apparatuses 1 to 3, the electric furnace's internal temperature was raised to 1000° C. while argon gas having an argon gas concentration of 100% by volume was supplied from the gas supplying unit into the CNT growing unit at a flow rate of 1000 cc/min (flow velocity: 3.4 cm/sec) for 50 minutes. Subsequently, in addition to the argon gas, methane gas was supplied at a flow rate of 50 cc/min (flow velocity: 0.17 cm/sec) and carbon disulfide ($CS_2$) gas was supplied at a flow rate of 1 cc/min (flow velocity: 0.003 cm/sec) for 120 minutes. A gaseous mixture including the argon gas, the methane gas, and the carbon disulfide (i.e., the carbon-containing gas) as a whole has a flow velocity of 3.6 cm/sec.

By thus supplying the argon gas, the methane gas and the carbon disulfide gas, a catalyst is disintegrated, and catalyst particles were thus discharged into the CNT growing unit. Thereafter, CNTs were grown in the CNT growing unit.

Thereafter, CNTs were drawn and assembled together in the CNT assembling unit and a CNT assembled wire was thus formed. While reeling the plurality of CNT assembled wires by the reeling apparatus, the volatile liquid (ethanol) was adhered to the CNT assembled wires, and then the volatile liquid was evaporated, thereby obtaining the CNT assembled wire bundle of each of samples 1 to 3.

Further, in each of apparatuses 2 and 3, the CNT assembled wire (CNT assembled wire of each of samples 2 and 3) discharged from the CNT assembling unit was also sampled.

<Measuring Carbon Nanotube Assembled Wire>

(Degree of Orientation)

The degrees of orientation of the carbon nanotube assembled wires of samples 2 and 3 were measured. The method for calculating the degrees of orientation is the same as the method described in the first embodiment, and accordingly, it will not be described repeatedly.

The degree of orientation of the CNT assembled wires of sample 2 was 0.93.

The degree of orientation of the CNT assembled wires of sample 3 was 0.91.

(Breaking Strength)

The breaking strengths of the CNT assembled wires of samples 2 and 3 were measured. A method for measuring the breaking strengths is as follows.

A CNT assembled wire having a length of about 3 cm was prepared, and both the ends of the CNT assembled wire were fixed to a pulling jig plate using an adhesive agent. A tensile stress until the CNT assembled wire of a length of 1 cm in its portion not fixed by the adhesive agent was broken was measured using a load cell (measurement instrument: "ZTS-5N" manufactured by IMADA Co., Ltd.).

The breaking strength of the CNT assembled wire of sample 2 was 6.8 GPa. The breaking strength of the CNT assembled wire of sample 3 was 7.2 GPa. These are comparable to the breaking strength of the conventional carbon fiber. That is, it was confirmed that the CNT assembled wire of each of samples 2 and 3 has excellent breaking strength.

<Measuring Carbon Nanotube Assembled Wire Bundle>

(Degree of Orientation)

The degrees of orientation of the carbon nanotube assembled wire bundles of samples 1 to 3 were measured. The method for calculating a degree of orientation of CNTs in a CNT assembled wire is the same as the method described in the first embodiment, and accordingly, it will not be described repeatedly. The method for calculating a degree of orientation of CNT assembled wires in a CNT assembled wire bundle is the same as that described in the second embodiment, and accordingly, it will not be described repeatedly. Results are shown in the "CNT Degree of Orientation" and the "CNT Assembled Wire Degree of Orientation" in Table 1.

(Raman Spectrum)

The Raman spectrum of each of the carbon nanotube assembled wire bundles of samples 1 to 3 was measured. The Raman spectrum of each of samples 1 to 3 is shown in FIG. 4. In FIG. 4, the range of the Raman shift of 120 cm$^{-1}$ or more and 210 cm$^{-1}$ or less is indicated as region A, and the range of the Raman shift of more than 210 cm$^{-1}$ and 280 cm$^{-1}$ or less is indicated as region B. In the range of the Raman shift of 120 cm$^{-1}$ or more and 280 cm$^{-1}$ or less, two peaks were observed in sample 1 and three peaks were observed in each of samples 2 and 3.

In each of regions A and B, the peak position of each peak, the peak intensity at the peak position, the FWHM and the integrated intensity, and integrated intensity ratio IB/IA were measured. A specific measurement method is the same as that described in each of the first and second embodiments, and therefore will not be described repeatedly. Results are shown in the columns "Peak Position", "Peak Intensity", "FWHM" and "Integrated Intensity" in Table 1.

TABLE 1

| CNT Assembled Wire Bundle | Sample 1 | | Sample 2 | | | Sample 3 | | |
|---|---|---|---|---|---|---|---|---|
| CNT Degree of Orientation | 0.92 | | 0.94 | | | 0.94 | | |
| CNT Assembled Wire Degree of Orientation | 0.85 | | 0.93 | | | 0.91 | | |
| Peak No. | 1 | 2 | 1 | 2 | 3 | 1 | 2 | 3 |
| Peak Intensity | 79 | 66 | 35 | 74 | 102 | 52 | 68 | 46 |
| Peak Position ($cm^{-1}$) | 145 | 172 | 171 | 235 | 271 | 163 | 234 | 269 |
| FWHM | 23 | 14 | 48 | 20 | 13 | 32 | 16 | 10 |
| Integrated Intensity | 2891 | 1428 | 2694 | 2305 | 2008 | 2637 | 1700 | 721 |
| Region A Integrated Intensity IA | 4319 | | 2694 | | | 2637 | | |
| Region B Integrated Intensity IB | 0 | | 4313 | | | 2421 | | |
| IB/IA | 0 | | 1.6 | | | 0.92 | | |
| Twisting Angle | 5 | | 3 | | | 4 | | |
| Breaking Strength (GPa) | 1.8 | | 3.2 | | | 3.8 | | |

(Raman Mapping)

For each of the CNT assembled wire bundles of samples 1 and 2, integrated intensities at 300 measurement points were plotted to create a Raman mapping. Results will be described with reference to FIGS. 5 to 10. It should be noted that in each of below-described Raman mapping images shown in FIGS. 6, 7, 9, and 10, as the integrated intensity is larger, a color is lighter.

Figure 5:
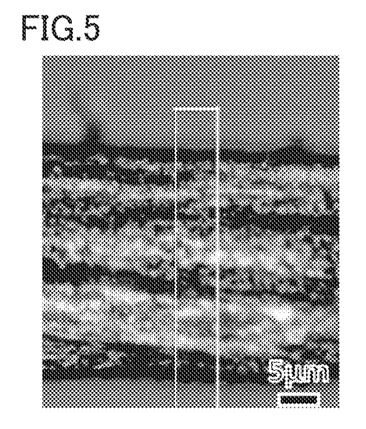
FIG. 5 shows an optical microphotograph of a carbon nanotube assembled wire bundle of a sample 1 of an example.
Figure 6:
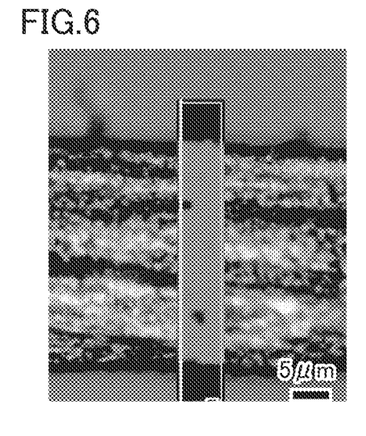
FIG. 6 is a diagram showing a Raman mapping image in a region A of a Raman spectrum of sample 1.
Figure 7:
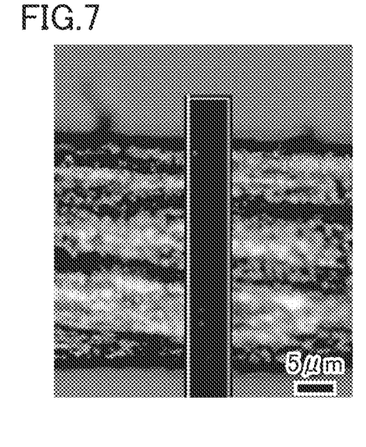
FIG. 7 is a diagram showing a Raman mapping image in a region B of a Raman spectrum of sample 1.

FIG. 5 is a diagram showing an optical microphotograph of the CNT assembled wire bundle of sample 1. In FIG. 5, a region surrounded by a rectangle corresponds to a region on which the Raman mapping was performed. FIG. 6 is a diagram showing a Raman mapping image in region A of the Raman spectrum of the CNT assembled wire bundle of sample 1. FIG. 7 is a diagram showing a Raman mapping image in region B of the Raman spectrum of the CNT assembled wire bundle of sample 1. A region surrounded by a rectangle in each of FIGS. 6 and 7 is a region on which the Raman mapping was performed.

Referring to FIGS. 6 and 7, it was confirmed that the integrated intensity of region A was larger than the integrated intensity of the region B in sample 1.

Figure 8:
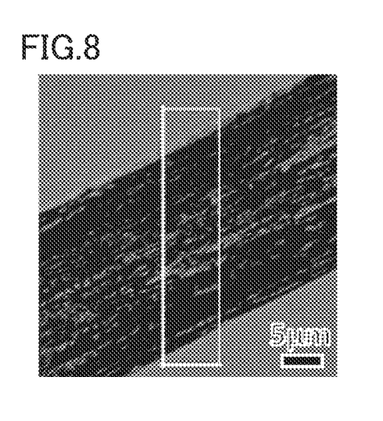
FIG. 8 shows an optical microphotograph of a carbon nanotube assembled wire bundle of a sample 2 of an example.
Figure 9:
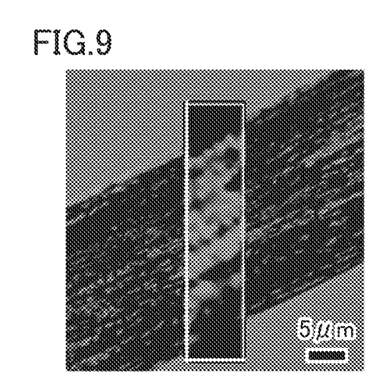
FIG. 9 is a diagram showing a Raman mapping image in a region A of a Raman spectrum of sample 2.
Figure 10:
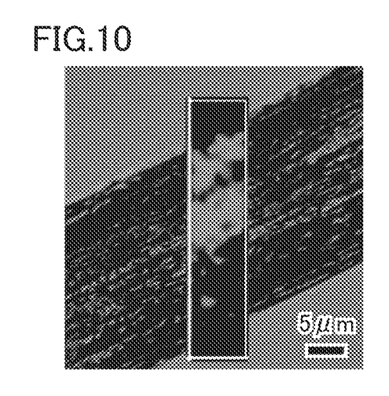
FIG. 10 is a diagram showing a Raman mapping image in a region B of a Raman spectrum of sample 2.

FIG. 8 is a diagram showing an optical microphotograph of the CNT assembled wire bundle of sample 2. In FIG. 8, a region surrounded by a rectangle corresponds to a region on which the Raman mapping was performed. FIG. 9 is a diagram showing a Raman mapping image in region A of the Raman spectrum of the CNT assembled wire bundle of sample 2. FIG. 10 is a diagram showing a Raman mapping image in region B of the Raman spectrum of the CNT assembled wire bundle of sample 2. A region surrounded by a rectangle in each of FIGS. 9 and 10 is a region on which the Raman mapping was performed.

Referring to FIGS. 9 and 10, it was confirmed that the integrated intensity of region B was larger than the integrated intensity of region A in sample 2.

(Twisting Angle)

The twisting angle of each of the CNT assembled wire bundles of samples 1 to 3 was measured by observation with an optical microscope. Results are shown in the column "Twisting Angle" of Table 1.

(Breaking Strength)

The breaking strength of each of the CNT assembled wire bundles of samples 1 to 3 was measured. The method for measuring the breaking strength is the same as the above-described method for measuring the breaking strength of the CNT assembled wire, and therefore will not be described repeatedly. Results are shown in "Breaking Strength" in Table 1.

<Evaluations>

The CNT assembled wire bundle of sample 1 has an integrated intensity ratio IB/IA of less than 0.1 and corresponds to a comparative example. Each of sample 2 and sample 3 has an integrated intensity ratio IB/IA of 0.1 or more and corresponds to an example of the present disclosure. It was confirmed that the breaking strength of each of samples 2 and 3 was more excellent than that of sample 1.

While embodiments and examples of the present disclosure have been described as above, it is also planned from the beginning that the configurations of the above-described embodiments and examples are appropriately combined and variously modified.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST 1 carbon nanotube assembled wire, 2 carbon nanotube, 3 carbon nanotube assembled wire bundle, 20 CNT assembled wire manufacturing apparatus, 21 CNT growing unit, 22 gas supplying unit, 23 catalyst supplying unit, 24 carbon nanotube assembling unit, 25 heater, 26 catalyst holder, 27 catalyst, 28 electric furnace, 29 honeycomb structure, 291 through hole, 50 bundling unit, 51 liquid adhering apparatus, 52 reeling apparatus, 53 volatile liquid, 54 vapor, 55 constriction, 500 carbon nanotube assembled wire bundle manufacturing apparatus, T tube portion, C cone portion, P catalyst particle.

The invention claimed is:

1. A carbon nanotube assembled wire comprising a plurality of carbon nanotubes, wherein
in a Raman spectrum of the carbon nanotube assembled wire, a ratio IB/IA of an integrated intensity IA in a range of a Raman shift of 120 $cm^{-1}$ or more and 210 $cm^{-1}$ or less and an integrated intensity IB in a range of a Raman shift of more than 210 $cm^{-1}$ 1 and 280 $cm^{-1}$ or less is 0.1 or more.

2. The carbon nanotube assembled wire according to claim 1, wherein the ratio IB/IA is 0.1 or more and 10 or less.

3. The carbon nanotube assembled wire according to claim 1, wherein in the carbon nanotube assembled wire, the plurality of carbon nanotubes are oriented at a degree of orientation of 0.9 or more and 1 or less.

4. A carbon nanotube assembled wire bundle comprising a plurality of the carbon nanotube assembled wires recited in claim 1, wherein
in a Raman spectrum of the carbon nanotube assembled wire bundle, the ratio IB/IA of the integrated intensity IA in the range of the Raman shift of 120 $cm^{-1}$ or more and 210 $cm^{-1}$ or less and the integrated intensity IB in the range of the Raman shift of more than 210 $cm^{-1}$ and 280 $cm^{-1}$ or less is 0.1 or more,
in the carbon nanotube assembled wire, the carbon nanotubes are oriented at a degree of orientation of 0.9 or more and 1 or less, and in the carbon nanotube assembled wire bundle, the carbon nanotube assembled wires are oriented at a degree of orientation of 0.8 or more and 1 or less.

5. The carbon nanotube assembled wire bundle according to claim 4, wherein a twisting angle of the carbon nanotube assembled wire bundle is 0° or more and 5° or less.

\* \* \* \* \*